May 28, 1940.  J. M. MACK  2,202,634
APPARATUS FOR FINDING LOCATION
Filed April 6, 1937  2 Sheets-Sheet 1

INVENTOR.
James M. Mack
BY
ATTORNEYS.

May 28, 1940.  J. M. MACK  2,202,634

APPARATUS FOR FINDING LOCATION

Filed April 6, 1937  2 Sheets-Sheet 2

INVENTOR.
James M. Mack
BY
ATTORNEYS.

Patented May 28, 1940

2,202,634

UNITED STATES PATENT OFFICE 2,202,634

APPARATUS FOR FINDING LOCATION

James M. Mack, Port Angeles, Wash.

Application April 6, 1937, Serial No. 135,276

2 Claims. (Cl. 250—11)

This invention relates to navigating equipment for use in determining the geographical location of either a stationary or a moving body, operating through the instrumentality of means by which an indication is had of the point of intersection of angularly related paths of radio reception and being particularly directed to improvements in that character of mechanism illustrated and described in my U. S. Letters Patent issued September 4, 1934, and numbered 1,972,388.

Being structurally of advanced form, the present invention has as its object to provide equipment for the above purpose which is more compact and inexpensive, and which generally is a more desirable unit from the standpoint of installation and facile operation than such equipment as has heretofore been developed for a similar purpose.

The invention consists in the novel construction adaptation, and combination of parts hereinafter described and claimed and more particularly consists in the novel arrangement of a rotatable aerial for radio reception and elements of advanced design associated therewith to chart a point common to rectilineal paths of radio waves emanating from two known and remote broadcasting stations located within the areal limits of a selected map which also includes the locale of the receiving body.

In the drawings—

Figure 1:
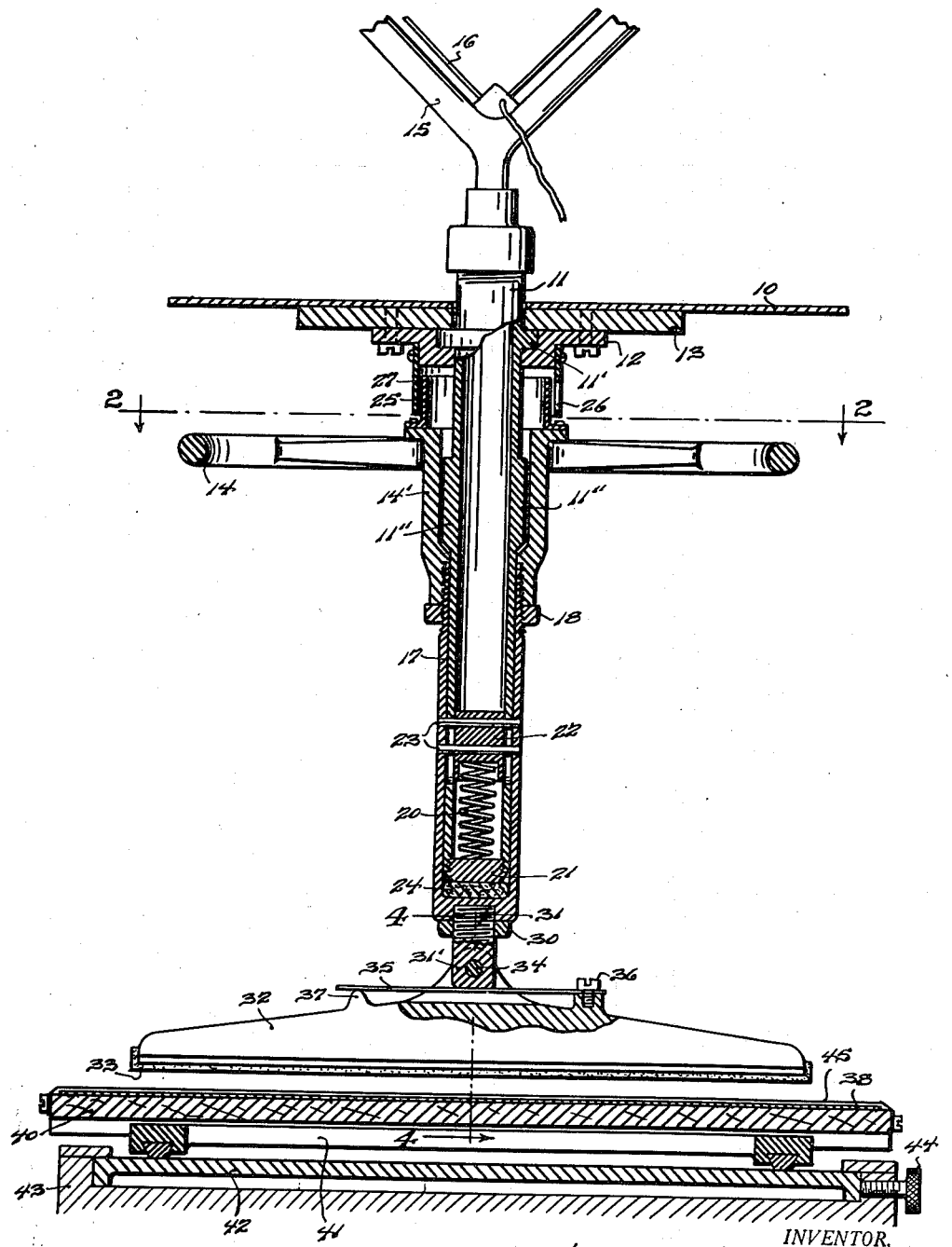
Figure 1 is a view taken in longitudinal vertical section through structure embodying the present invention, the view being somewhat fragmentary in that the associated loop aerial and the base mounting for the chart table are broken away.
Figure 2:
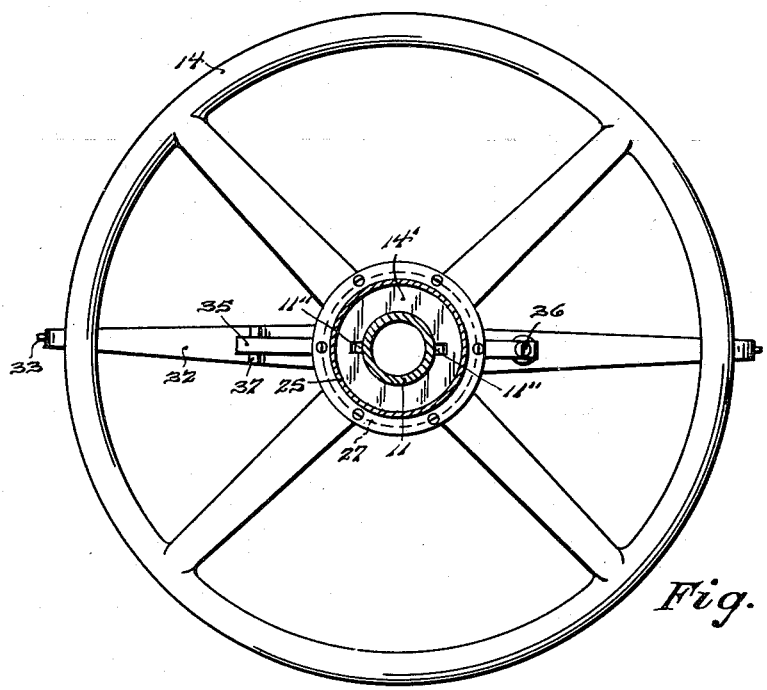
Fig. 2 is a horizontal section thereof taken on the line 2—2 of Fig. 1.
Figure 3:
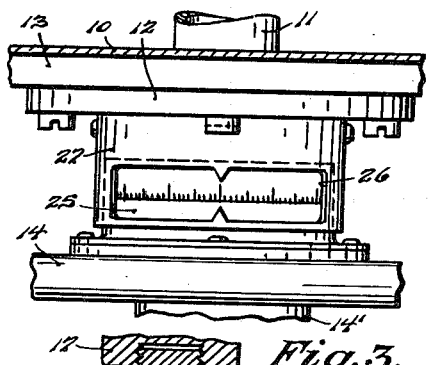
Fig. 3 is a fragmentary elevational view detailing the calibration drum which moves in unison with the loop aerial for indicating the degree of deviation of the aerial from a point fixed with respect to the receiving body.
Figure 4:
Fig. 4 is a detail transverse section to an enlarged scale taken on the line 4—4 of Fig. 1.
Figure 5:
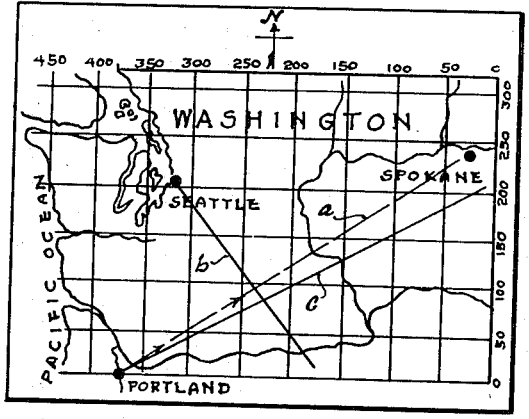
Fig. 5 is a plan view illustrating the manner in which the invention is applied to indicate, on a map of the immediate vicinity, the location of the body.

The invention obviously is applicable to ships at sea or land parties but for illustrative purposes I disclose in Fig. 5 a chorographical map of the character commonly employed in aeronautics as a guide to the pilot of a transport or other air vehicle, delineating the particular region being traversed. To facilitate a clear understanding of the hereinafter described invention, I have indicated on this sectional map a plane route, as Portland to Spokane, by the dotted line a. Insofar as the principle of operation is concerned, the invention is similar to my referred-to issued patent which permits a plane pilot to at any time ascertain his exact location by recourse to radio waves, utilizing for this purpose a loop aerial which has the characteristic that a peak impulse is transmitted to the receiving set at that position of the aerial at which the same lies in direct alignment with the station from which radio signals are emanating. The finding of location is effected by the successive steps of locating the map for true meridian and producing on the map two intersecting lines b and c which define the plane of the loop aerial at the moment at which the receiving set shows its strongest response to the signals of selected broadcasting stations, the map in each instance being disposed to have the reproduced plane of radio reception pass through the map-designated stations, as for example Seattle and Portland, from which the radio signals are received. It is evident that the point at which these two lines b and c cross is the location of the receiving body.

The numeral 10 in the drawings denotes the ceiling wall of the cabin of a plane and extending vertically therethrough is a tube 11 which finds a bearing in a member 12. 13 designates a supporting plate for the bearing member and this plate desirably extends the width of the cabin as a re-inforcing member therefor. Revolubly received between members 12 and 13 is an annular flange 11' integral with the tube and operating to provide a thrust bearing for securing the tube against axial movement.

This tube 11 is associated with a control wheel 14 and acts as an intermediary therefrom to regulate the position of an aerial frame 15 on which is strung the loop aerial 16 employed in the invention, a suitable lead from such aerial extending to a receiving set (not shown). Said frame for the aerial, as illustrated, connects directly with the tube and thereby lies in axial alignment with the latter although it is obvious that an equivalent positive connection from the tube to an aerial frame lying in remote relation thereto would provide similarly efficient results.

Operating as a connection between the tube and the control wheel, the axially bored hub 14' of the wheel is formed with key-ways and in these key-ways splines 11'' of the tube are slidably received. 17 designates a sleeve which threads into a counter-bore of the hub and is fixed in position by a lock-nut 18 to constitute an axial prolongation of the hub, the sleeve having a closed end wall from which is suspended a stamping foot member to be hereinafter described, said foot member acting as a marking device to visibly indicate, as the foot member is depressed, a rectilineal line defining a positioned plane of the aerial frame. Said depression of the foot member is opposed by a spring 20, the spring being received in the lower end of the tube between a plug 21 and a sliding cage 22, the latter connecting with the sleeve 17 by transverse pins 23 which pass through vertical slots in the wall of the tube. A shock-absorbing buffer 24, desirably of sponge rubber, is interposed between the lower end wall of the sleeve and the tube plug to cushion the spring-influenced elevational movement of the sleeve.

At 25 is represented a calibration collar secured to the hub of the control wheel, the graduated markings thereon being visible through the sight opening 26 of a stationary skirt 27 for indicating deviation of the loop aerial from a fixed vertical line.

Reverting to said stamping foot member, such is comprised of a block 32 having its underside grooved, in which groove a marker 33, either an ink-impregnated wick or as may be otherwise desired, is fitted, the block connecting with the sleeve 17 by a threaded stud 31 with which is employed a lock-nut 30 for securing the marker in revolubly adjusted relation to the plane of the loop aerial, an adjustment which locates the marker either in the substantial vertical plane of or parallel to the loop aerial according as to whether the revoluble axis of the latter is aligned with or in remote relation to the axis of the tube 11. With the object of assuring parallelism as between the horizontal plane of the marker and that of the map with which the same is employed during a marking operation, the block 32 is flexibly supported and to this end is pivoted by a pin 34 to a tongue extension 31' of the stud 31, the tongue fitting in a slot formed by bifurcating the block and having its underside flattened for the yieldable seating engagement of a leaf spring 35, one end of the spring being fixed as at 36 to the block with the opposite free end supported by a shoulder post 37.

The map is represented by 38 and, in essentially the same manner as disclosed in my issued patent, is supported for revoluble and sliding movements, the latter movement being in two intersecting planes which preferably are in right angular relation. This support for the map, as indicated, comprises superposed complementary tables 40, 41, and 42, the tables 40 and 41 having tongue-and-groove slide connection with tables 41 and 42, respectively, and table 42 being in turn revolubly mounted in a suitable stationary support 43. A knurled screw 44 allows the table 42 to be set following a location of the same, by recourse to a compass, for true meridian.

The manner in which the equipment is used is believed clear from the foregoing description of the preferred embodiment of the invention taken in connection with the illustration of Fig. 5 showing the two intersecting lines which are produced successively by depression of the stamping foot member, the positioning of the map for each of such depression movements being effected by sliding the tables 40 and 41 to have the map-indicated radio station which is being received in each instance lie in the line of the wick 33 or, in other words, lie in the true plane of radio reception. In order to prevent a defacing of the map surface, it is desirable that the lines be applied on a Celluloid cover, as 45, rather than directly on the map.

I intend that no restrictions in the inventive scope be implied excepting as limitations are necessarily used in the hereto annexed claims to distinguish over prior knowledge in the art.

What I claim is:

1. Mechanism of the character described employed with a radio-wave transmitting station for finding the location of a body, said mechanism comprising, in combination with a wave-intercepting aerial operative to indicate direction from the body to the station, a hollow shaft revolubly supporting the aerial for movement about a vertical axis, a hand wheel having its hub splined to the shaft to revolubly couple the same while permitting axial movement of the hand wheel relative to the shaft, said hand wheel having a sleeve extension fitting over the shaft and constituting an axial prolongation of the hub, a marker carried by and revolubly adjustable with respect to the sleeve extension, a spring received in the bore of the shaft and operatively connected with the sleeve for opposing marker-depressing axial movement of the hand wheel, and means for cushioning the elevational return movement of the hand wheel under the reactive influence of the spring.

2. Mechanism, using a chorographical map embracing the position of a body and two remote points, for finding the location of the body by the act of reproducing on the map an angle of which the sides are direct lines between the body and the remote points, the map, in such operation of reproducing the angle thereon, being positioned to localize the remote points in relation to the position of the body to have the directional lines pass through the remote points, the mechanism comprising the combination of means for determining said directions, a member mounted for rotative positioning according to the determined directions, and a marker rotatively positioned by said member for delineating on the map the angle of which the determined directional lines are the sides, the marker having a flexible mounting comprised of a flattened surface and a leaf spring bearing against said flattened surface to assure parallelism as between the same and the map in the map-marking operation of the marker and having means associated with the flexible mounting for yieldably resisting deflection of the marker from a determined normal position.

JAMES M. MACK.